May 20, 1958 T. P. SULLIVAN 2,835,097
ROW CROP PICK-UP ATTACHMENT FOR COMBINES
Filed Nov. 25, 1955 4 Sheets-Sheet 1
FIG_1
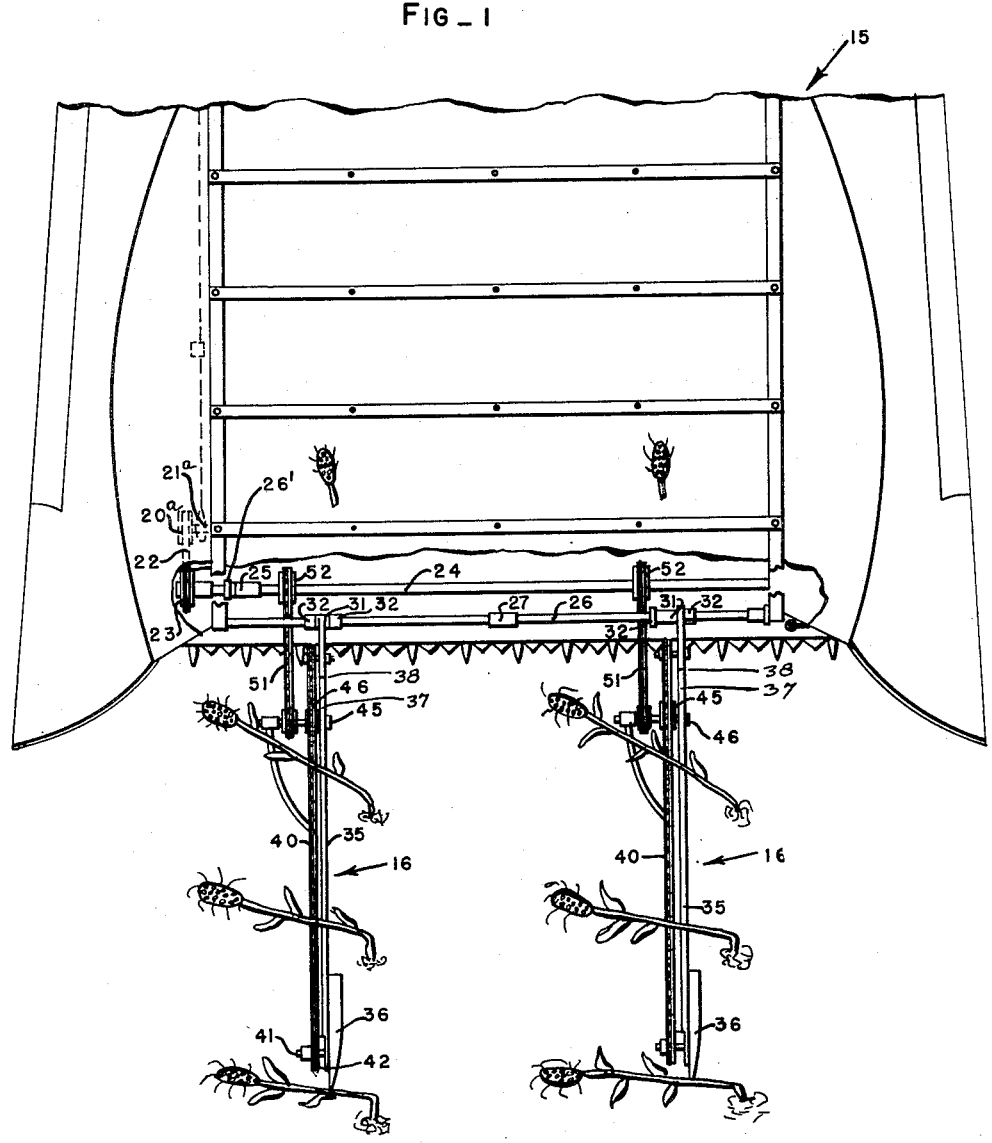
INVENTOR.
THOMAS PAUL SULLIVAN
BY
*Patrick D Beavers*
ATTORNEY May 20, 1958  T. P. SULLIVAN  2,835,097
ROW CROP PICK-UP ATTACHMENT FOR COMBINES
Filed Nov. 25, 1955  4 Sheets-Sheet 2
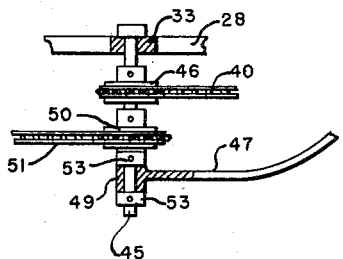
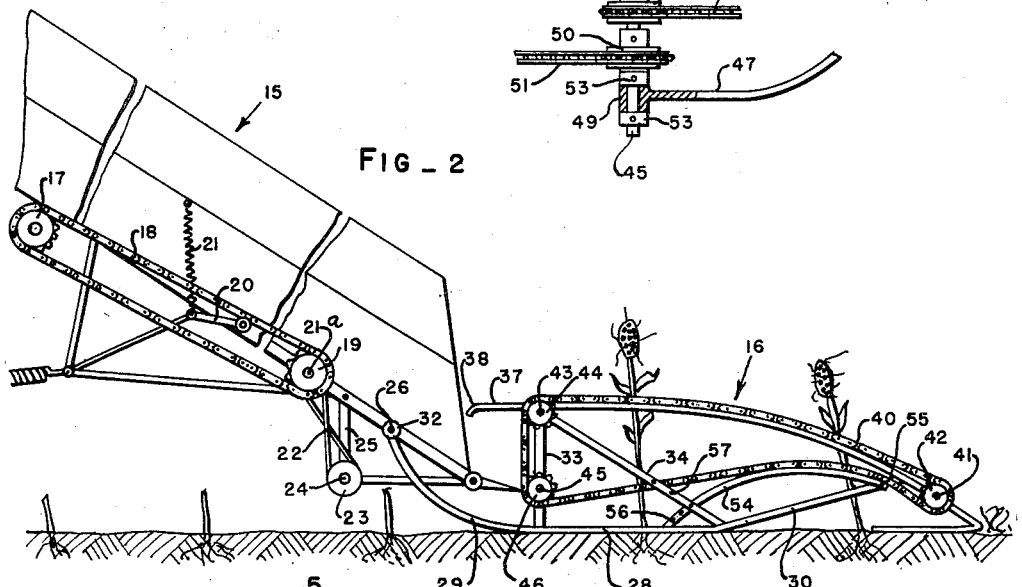
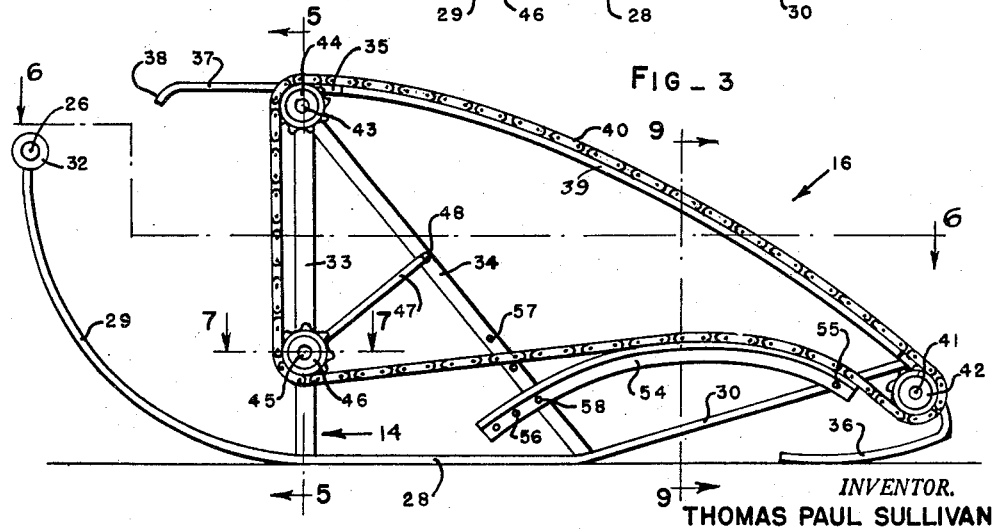
INVENTOR.
THOMAS PAUL SULLIVAN
BY
Patrick D. Beavers
ATTORNEY May 20, 1958 T. P. SULLIVAN 2,835,097
ROW CROP PICK-UP ATTACHMENT FOR COMBINES
Filed Nov. 25, 1955 4 Sheets-Sheet 3
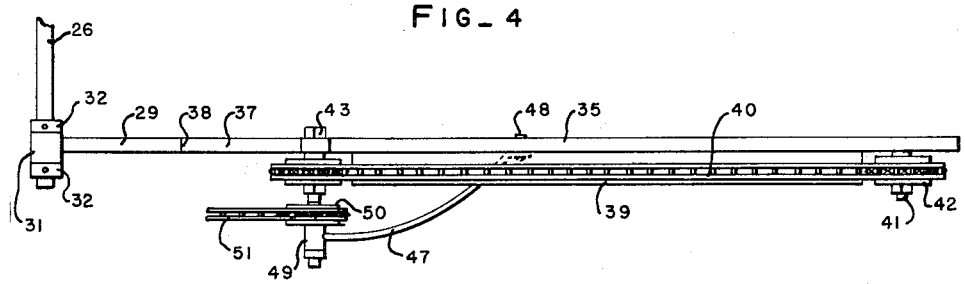
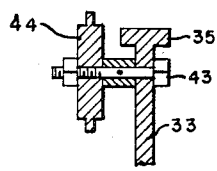
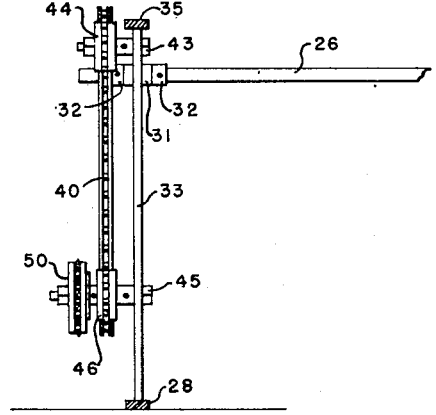
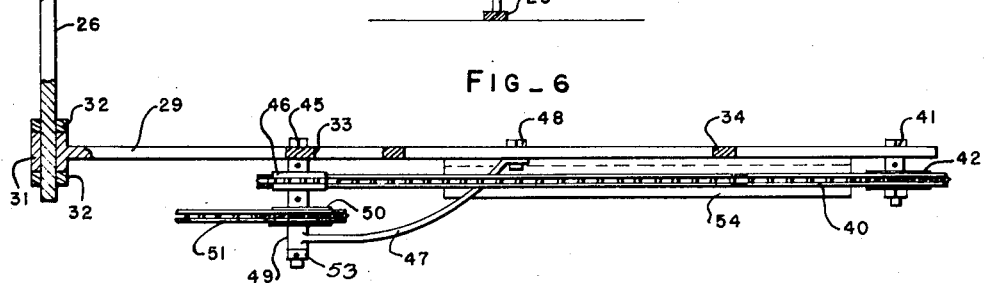
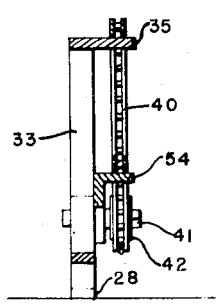
INVENTOR.
THOMAS PAUL SULLIVAN
BY
Patrick D Beavers
ATTORNEY

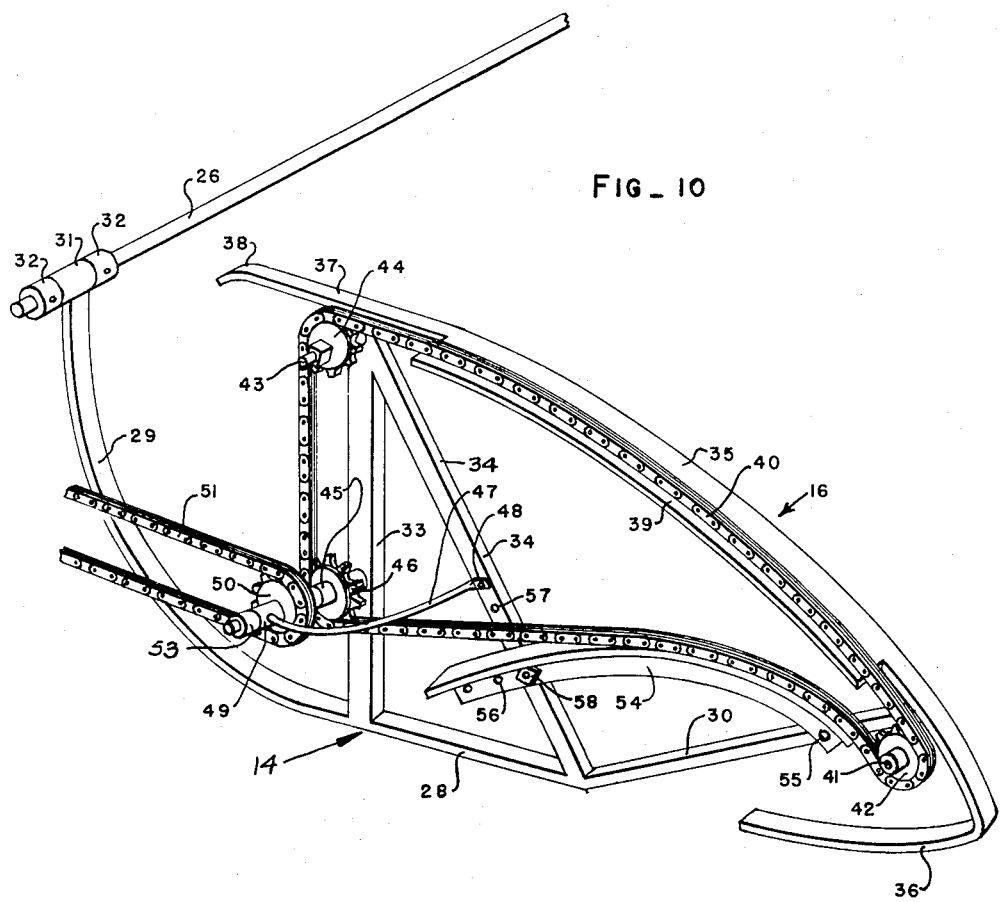
FIG_10
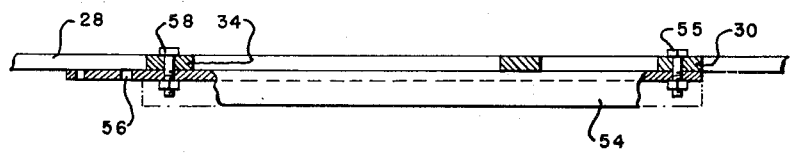
FIG_11

United States Patent Office 2,835,097
Patented May 20, 1958

2,835,097
ROW CROP PICK-UP ATTACHMENT FOR COMBINES

Thomas P. Sullivan, Olney Springs, Colo.

Application November 25, 1955, Serial No. 548,942

1 Claim. (Cl. 56—98)

This invention relates to improvements in pickup attachments for combines that will lift and pick up fallen row crops such as maise and other sorghums.

An object of this invention is to provide an attachment that will pick up fallen row crops so that they can be fed into a combine.

Another object of this invention is to provide an attachment that can be equipped with selective drives so that combines of different types may be used with the attachment.

With the above and other objects and advantages in view the invention consists of the novel details of construction, arrangement and combination of parts more fully hereinafter described, claimed and illustrated in the accompanying drawings in which:

Fig. 1 is a top plan view, partly broken away, of a portion of a combine having a pickup attachment embodying the invention connected in operative relation thereto;

Fig. 2 is a fragmentary side elevation of Fig. 1;

Fig. 3 is an enlarged fragmentary side elevational view of the pickup attachment;

Fig. 4 is a fragmentary bottom plan view of Fig. 3;

Fig. 5 is a vertical sectional view on the line 5—5 of Fig. 3;

Fig. 6 is an enlarged sectional view taken substantially along line 6—6 of Fig. 3;

Fig. 7 is a longitudinal sectional view on the line 7—7 of Fig. 3;

Fig. 8 is an enlarged sectional view of a sprocket mounting;

Fig. 9 is a vertical sectional view on the line 9—9 of Fig. 3;

Fig. 10 is a perspective view of the pickup attachment; and

Fig. 11 is a top plan view, partly in section, of a chain tightener.

Referring more in detail to the drawings, wherein like parts are designated by like reference numerals, the reference numeral 15 is used to designate a combine with which the pickup attachment 16 embodying the invention is associated.

The combine 15 includes a sprocket 17 which is on the reel drive of the combine and the sprocket 17 has a chain belt connection 18 with a second sprocket 19. The combine is also equipped with a chain idler 20 that is tensioned by a spring 21. The other elements are conventional with well known combines.

A pulley 20a on the shaft 21a for the sprocket 19 has a V-belt connection 22 with a pulley 23 on a counter-shaft 24 that is journalled in brackets 25 that are mounted on the combine 15. A collar 26' on the shaft 24 prevents lateral play of the shaft 24.

A shaft 26 is mounted on the combine 15 forwardly of the shaft 24 and a bearing sleeve 27 for the shaft 26 is secured to the combine 15.

The pickup attachment 16 comprises a main frame generally indicated at 14 having a base portion 28, an arcuate portion 29 at one end of the base portion 28 and an upwardly inclined angled portion 30 at the opposite end of the base portion 28.

A bearing sleeve 31 on the free end of the arcuate portion 29 pivots the pickup attachment 16 on the shaft 26. Collars 32 on the shaft 26 on opposite ends of the sleeve 31 prevents lateral displacement of the pickup attachment 16.

Mounted on the base portion 28 is a vertically disposed bar 33 and a diagonally disposed brace 34 is connected at one end to the upper end of the bar 33 and at its opposite end to the end of the base portion 28 where it joins the angled portion 30.

An arcuate trackway 35 is connected to the upper end of the bar 33 and the forward end of the angled portion 30. A curved shoe 36 is integral with the forward end of the trackway 35 and a grain guide 37 having a curved rear end 38 is integral with the rear end of the trackway 35.

A shelf 39 forms part of the trackway 35 and supports the endless chain 40.

A stub shaft 41 for a sprocket 42 is connected to the trackway 35, a second stub shaft 43 for a sprocket 44 is connected to the upper end of the bar 33 and a third stub shaft 45 for a sprocket 46 is mounted on the bar 33 adjacent the lower end thereof. The sprockets 42, 44 and 46 all engage the chain 40.

A curved brace 47 is connected at one end at 48 to the brace 34 and a bearing 49 for supporting the shaft 45 is mounted on the opposite end of the brace 47. Collars 53 on the shaft 45 retain the bearing 49 in position on the shaft 45.

A second sprocket 50 on the shaft 45 has a chain drive connection 51 with a sprocket 52 on the counter-shaft 24.

An arcuate chain tightener 54 is connected at one end at 55 to the angled portion 30 and at its opposite end is provided with a plurality of openings 56 so that such openings can be selectively arranged with respect to the openings 57 in the brace 34. Thus a bolt 58 selectively inserted through the openings 56 and 57 will adjust the tightener 54 to tighten the chain 40.

The tightener 54 is of L-formation in cross sectional area and supports or engages the chain 40, as shown in Fig. 10.

In Fig. 1, two pickup attachments 16 are shown connected to the combine 15, but more may be used as desired. The bearing sleeve 31 of the attachment may be slid onto the shaft 26 and collars 32 will be used to retain the attachments in spaced relation to each other.

As the combine travels over the field the pickup attachments will slide down the rows and pick up grain that would usually be lost to the farmer. Such grain would be a complete loss unless he had cattle that could graze in the fields. The attachment would be a great asset to the farmer in the saving of lost grain and due to the pivotal action of the bearing sleeve 31 on the shaft 26, the shoe 36 will follow the contour of the ground without digging into the uneven field.

As the shaft 21a of the combine rotates, the shaft 24 will be rotated which in turn will cause the chain 40 to travel over the trackway 35 and over the tightener 54. As the forward end of the trackway lifts up the grain as in Fig. 1, the chain 40 will lift the grain into the combine.

It is believed that the construction and manner of use of the attachment will be clear to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A pickup attachment for a combine including a transversely extending shaft, said attachment comprising a vertically extending frame, a horizontal ground-engaging base, a rearwardly and upwardly curved portion connected to the rear of said base, a bearing sleeve fixed to the rear end of said arcuate portion pivotally mounted upon said shaft of the combine, an upwardly and rearwardly extending shelf, an upwardly and forwardly extending member interconnecting the forward end of the base and the forward portion of said shelf, a rearwardly extending guide formed integrally with the rear end of said shelf and having a downwardly curved rear end terminating adjacent the forward end of said combine, a downwardly and rearwardly extending curved ground-engaging shoe formed integrally with the forward end of said shelf, brace members interconnecting the base and the guide, sprockets carried by said frame forwardly and rearwardly of said shelf, a drive sprocket mounted on one of said brace members below one of said first-mentioned sprockets, an endless chain entrained over all of said sprockets and overlying said shelf, and an arcuate chain tightener carried by said frame and adjustably presenting its convex face to a portion of said chain.

References Cited in the file of this patent
UNITED STATES PATENTS

| | | |
|---|---|---|
| 474,359 | Bowen | May 10, 1892 |
| 953,265 | Ginaca | Mar. 29, 1910 |
| 955,684 | Pritchard | Apr. 19, 1910 |
| 2,399,774 | Welty | May 7, 1946 |